United States Patent [19]
Schetter et al.

[11] Patent Number: 5,598,747
[45] Date of Patent: Feb. 4, 1997

[54] THERMAL COMPENSATING BEARING SUPPORT STRUCTURE FOR TRANSMISSION CASE

[75] Inventors: George F. Schetter, Holland; Steven N. Tucker, Jr., Toledo, both of Ohio

[73] Assignee: Dana Corporation, Toledo, Ohio

[21] Appl. No.: 434,657

[22] Filed: May 4, 1995

[51] Int. Cl.$^6$ ............ F16C 35/077; F16H 57/02
[52] U.S. Cl. ............ 74/606 R; 384/557; 384/582; 384/905
[58] Field of Search ............ 74/331, 606 R; 384/493, 536, 557, 582, 905

[56] References Cited

U.S. PATENT DOCUMENTS

| | | | |
|---|---|---|---|
| 2,473,267 | 6/1949 | Wightman | 384/536 |
| 2,588,636 | 3/1952 | Korsgren . | |
| 2,653,063 | 9/1953 | Arndt et al. | 384/536 |
| 2,700,581 | 1/1955 | Migny | 384/905 |
| 2,803,507 | 8/1957 | Mempel et al. . | |
| 3,015,932 | 1/1962 | McCard . | |
| 3,767,169 | 10/1973 | Carpigiani | 259/85 |
| 3,897,985 | 8/1975 | Davis et al. | 384/536 |
| 4,089,569 | 5/1978 | Rempel | 308/184 |
| 4,329,000 | 5/1982 | Keske | 384/493 |
| 5,028,152 | 7/1991 | Hill et al. | 384/557 |
| 5,367,914 | 11/1994 | Ordo | 74/331 |

FOREIGN PATENT DOCUMENTS

| | | | |
|---|---|---|---|
| 0018120 | 2/1981 | Japan | 384/493 |

OTHER PUBLICATIONS

"Machine Design" magazine, pp. 70–74, dated May 19, 1994.

"Thermal Compensating Tapered Roller Bearings", brochure dated 1991.

SAE Paper No. 910799 dated Feb. 25, 1991.

Eaton Fuller Transmissions Illustrated Parts List, p–562–R5 dated Dec. 1987.

*Primary Examiner*—Rodney H. Bonck
*Attorney, Agent, or Firm*—MacMillan, Sobanski & Todd

[57] ABSTRACT

An improved structure supports a bearing in a bore provided in a portion of a transmission case and prevents relative rotation therebetween. In a preferred embodiment, the clutch housing portion of a transmission case is made from aluminum and includes an interior wall having a bore formed therein. A circumferential groove is formed in the side wall of the bore, and a compressible or elastomeric O-ring is disposed in the groove. A bearing is made from steel and includes an inner race, an outer race, and a plurality of rollers disposed between the races. As the bearing is pressed into the bore, the O-ring is compressed completely within the groove. So long as both the aluminum clutch housing and the steel outer race of the bearing remain in a relatively cold condition, the outer race will frictionally engage the inner surface of the bore, thus preventing any relative rotational movement therebetween. However, after operation of the transmission, the temperatures of both the aluminum clutch housing and the steel outer race of the bearing will increase. Because aluminum expands at a greater rate per unit temperature than steel, the inner diameter defined by the bore will increase at a greater rate than the outer diameter defined by the outer race. As a result, a small gap may be created therebetween. When this gap is created, the O-ring expands out of the groove formed in the inner surface of the bore to maintain a frictional engagement with the outer race of the bearing. Consequently, relative rotation between the two is prevented. This avoids premature wear and failure which can result from such relative rotational movement.

20 Claims, 2 Drawing Sheets

THERMAL COMPENSATING BEARING SUPPORT STRUCTURE FOR TRANSMISSION CASE

BACKGROUND OF THE INVENTION

This invention relates in general to vehicle transmissions and in particular to an improved structure for supporting a bearing with a vehicle transmission case.

In most vehicles, a transmission is provided in the drive train between the engine and the driven wheels. As is well known, the transmission includes a case containing an input shaft, an output shaft, and a plurality of meshing gears which are selectively connected between the input shaft and the output shaft. The meshing gears contained within the transmission case are of varying size so as to provide a plurality of speed reduction gear ratios between the input shaft and the output shaft. By appropriate selection of these meshing gears, a desired speed reduction gear ratio can be obtained between the input shaft and the output shaft. As a result, acceleration and deceleration of the vehicle can be accomplished in a smooth and efficient manner.

Typically, this gear ratio selection is accomplished by moving one or more control members provided within the transmission case. Movement of the control member causes certain ones of the meshing gears to be connected between the input shaft and the output shaft so as to provide the desired gear ratio therebetween. In a manual transmission, movement of the control member is accomplished by manual exertion of the vehicle driver, such as through a shift lever. In an automatic transmission, movement of the control member is accomplished by a pneumatic or hydraulic actuator in response to predetermined operating conditions.

In many medium and heavy duty manual transmissions, the case of the transmission is divided into two or three portions. The forward portion of the transmission case is usually referred to as the clutch housing. The clutch housing is sized to extend over and protectively enclose a manually operable clutch connected between the engine of the vehicle and the input shaft of the transmission. The central portion of the transmission case is usually referred to as the main housing. The main housing contains most of the shafts, gears, and other components which are used to provide a group of gear ratios to operate the transmission. In compound transmissions (i.e., those transmissions which are composed of a first group of gear ratios provided by a main section and one or more additional groups of gear ratios provided by an auxiliary section), the transmission case may include a rear portion. The rear portion of the transmission case is usually referred to as the auxiliary housing and contains most of the shafts, gears, and other components which are used to provide the additional group or groups of gear ratios provided by the auxiliary section.

In a typical transmission, it is usually necessary to support the ends of one or more shafts for rotation. To accomplish this, it is well known to form some of the portions of the transmission case with cylindrical bores or recesses and to provide annular bearings within such bores for rotatably supporting the ends of the shafts. A typical annular bearing includes an inner race, an outer race, and a plurality of rollers, such as cylinders or balls, disposed between the races. The outer race is pressed into the cylindrical recess formed in the transmission case and is frictionally engaged therewith to prevent any relative rotational movement. Similarly, the inner race is frictionally engaged or otherwise secured to the shaft to prevent any rotational movement therebetween. Thus, the rollers accommodate all of the relative rotational movement between the outer race (connected to the transmission case) and the inner race (connected to the shaft). No relative rotational movement should occur between the outer race and the transmission case. Such movement can cause undesirable looseness which could lead to premature wear or failure.

In the past, the various housings of the transmission case have all been made from iron. Although iron is well suited for use in manufacturing each of these housings, it is also a relatively heavy material. Because of increasing concerns about fuel economy in vehicles, efforts have been made recently to reduce the weight of various vehicle components. As a result, it is known to use a lighter weight aluminum alloy to form the clutch housing of the transmission case, while continuing to form the main housing of the transmission case from iron.

In further developing the use of aluminum alloys to form the clutch housing of the transmission case, it has been discovered that the annular bearings used to rotatably support the ends of shafts on the aluminum clutch housing tended to lose their frictional engagement with the associated bores after operation of the transmission. It has been determined that this looseness is caused by a differential in the rates of thermal expansion between aluminum alloys and steel. The aluminum alloy used to form the clutch housing expands a relatively large amount as the temperature increases. The steel used to form the outer races of the annular bearings, on the other hand, expands a relatively small amount as the temperature increases. Consequently, the bores formed in the aluminum clutch housing expand radially to a significantly greater extent than the outer races of the annular bearings disposed therein. As a result, the side walls of the bores expand away from the outer races of the bearings when the temperature increases because of normal usage of the transmission. When this occurs, the outer races lose their frictional engagement with the associated bores. This looseness permits undesirable relative rotational movement between the outer race and the clutch housing. Conventional transmissions formed completely of iron do not experience this problem because the rates of thermal expansion of iron and steel are sufficiently similar as to prevent this from occurring. In aluminum housings, this problem can be addressed by use of a heavy interference fit between the bearing and the bore. Unfortunately, it causes installation problems since the soft aluminum bore is easily damaged when pressing the steel race with a high interference fit. This hinders installation and can cause bearing misalignment.

Thus, it would be desirable to provide an improved structure for supporting a bearing in a bore provided in a portion of a transmission case and for preventing relative rotation therebetween when the bearing and the transmission case are formed from materials having different rates of thermal expansion.

SUMMARY OF THE INVENTION

This invention relates to an improved structure for supporting a bearing in a bore provided in a portion of a transmission case and for preventing relative rotation therebetween. In a preferred embodiment, the clutch housing portion of a transmission case is made from aluminum and includes an interior wall having a bore formed therein. A circumferential groove is formed in the side wall of the bore, and a compressible or elastomeric O-ring is disposed in the groove. A bearing is made from steel and includes an inner race, an outer race, and a plurality of rollers disposed between the races. As the bearing is pressed into the bore, the O-ring is compressed completely within the groove. So long as both the aluminum clutch housing and the steel outer race of the bearing remain in a relatively cold condition, the outer race will frictionally engage the inner surface of the bore, thus preventing any relative rotational movement therebetween. However, after operation of the transmission, the temperatures of both the aluminum clutch housing and the steel outer race of the bearing will increase. Because aluminum expands at a greater rate per unit temperature than steel, the inner diameter defined by the bore will increase at a greater rate than the outer diameter defined by the outer race. As a result, a small gap may be created therebetween. When this gap is created, the O-ring expands out of the groove formed in the inner surface of the bore to maintain a frictional engagement with the outer race of the bearing. Consequently, relative rotation between the two is prevented. This avoids premature wear and failure which can result from such relative rotational movement.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
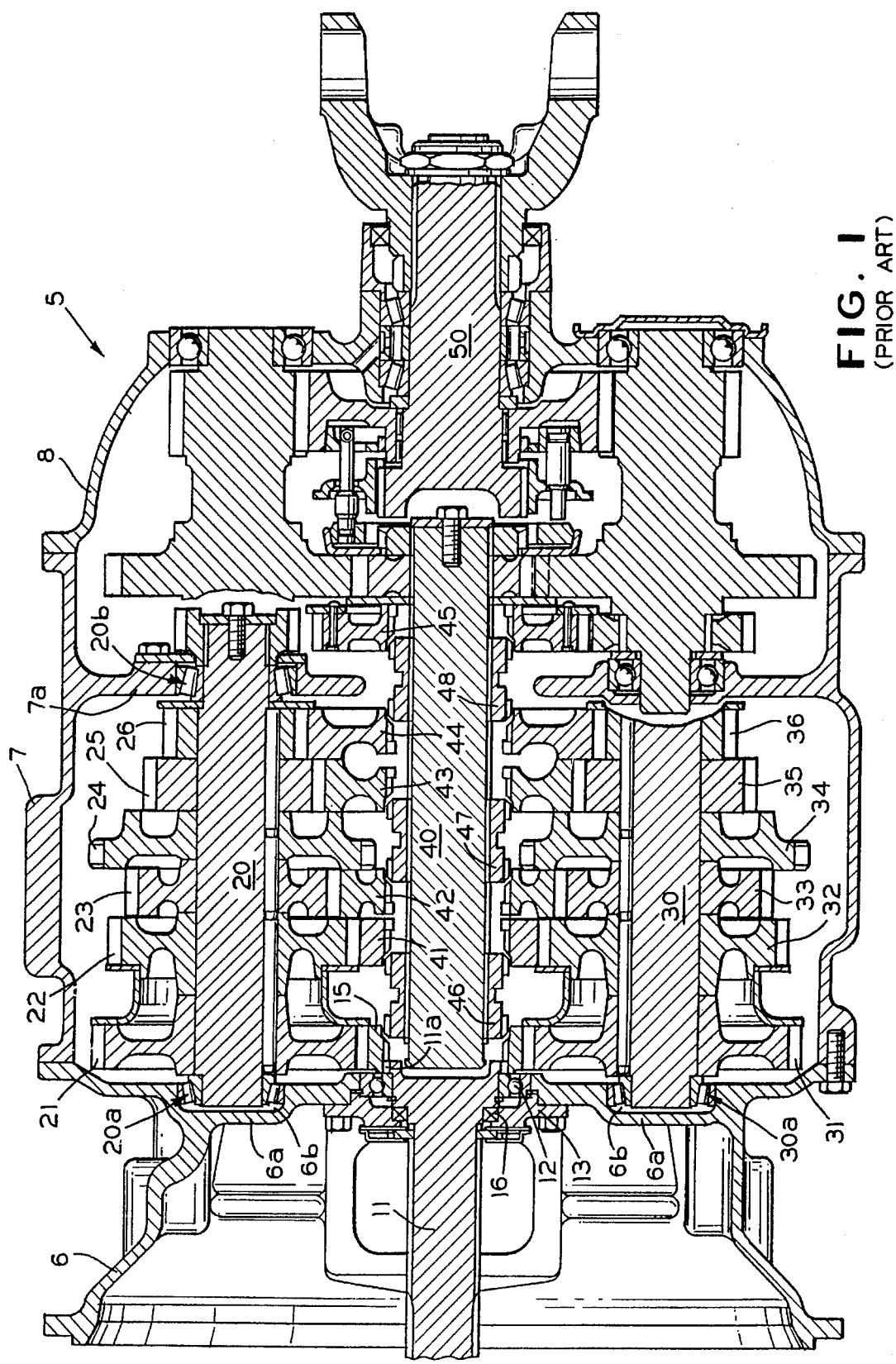
FIG. 1 is a top plan view, partially in cross section, of a prior art vehicle transmission.

Referring now to the drawings, there is illustrated in FIG. 1 a twin countershaft compound transmission, indicated generally at 5, which is known in the art. The illustrated transmission 5 is intended to be representative of any known vehicle transmission structure, either manually or automatically shifted, and only a brief overview of the structure and operation of the illustrated transmission 5 is necessary for a complete understanding of this invention. The transmission 5 includes a case which supports and protectively encloses the various components thereof. In the illustrated embodiment, the case of the transmission 5 is divided into three portions, namely, a forward portion 6, a central portion 7, and a rear portion 8. The forward portion 6 of the transmission case is usually referred to as the clutch housing. The clutch housing 6 is sized to extend over and protectively enclose a manually operable clutch assembly (not shown) which is connected between the engine of the vehicle and an input shaft 11 of the transmission 5. The central portion 7 of the transmission case is usually referred to as the main housing. The main housing 7 contains most of the shafts, gears, and other components which are used to provide a group of gear ratios to operate the transmission 5, as will be explained below. Lastly, the rear portion 8 of the transmission case is usually referred to as the auxiliary housing. The auxiliary housing 8 contains most of the shafts, gears, and other components which are used to provide an additional group or groups of gear ratios provided by the auxiliary section.

The input shaft 11 is adapted to be rotatably driven, such as by a conventional internal combustion or diesel engine (not shown). As mentioned above, the clutch assembly is connected between the vehicle engine and the input shaft 11 of the transmission 5. A first portion of the clutch assembly is connected to an output shaft of the engine. A second portion of the clutch assembly is mounted on the input shaft 11 for rotation therewith, typically by means of cooperating keys or splines. When the clutch assembly is engaged, the output shaft of the engine is connected to the input shaft 11 of the transmission 5 for rotation therewith. The input shaft 11 is supported for rotation by a bearing 12 mounted in an opening formed through a bearing cap 13 secured to an interior wall 6a provided on the clutch housing 6 of the transmission case. The axial inner end of the input shaft 11 is formed having an integral toothed gear portion 11a which meshes with a plurality of radially inwardly extending teeth formed on an annular input drive gear 15. A seal 16 is provided about the input shaft 11 for preventing lubricant contained within the transmission 5 from escaping.

Within the main housing 7 of the transmission case, a first countershaft 20 is rotatably supported on a pair of tapered bearings 20a and 20b. The forward tapered bearing 20a is received within a bore or recess 6b formed in the interior wall 6a of the clutch housing 6. The rearward tapered bearing 20b is received within a similar bore formed in the inner surface of an interior wall 7a provided on the main housing 7 of the transmission case. A plurality of gears 21, 22, 23, 24, 25 and 26 are keyed onto the first countershaft 20 for rotation therewith. The input drive gear 15 further includes a plurality of radially outwardly extending teeth which mesh with a corresponding plurality of teeth formed on the first one 21 of the first countershaft gears. Thus, when the input shaft 11 is rotated, the is input drive gear 15, the first countershaft 20, and all of the first countershaft gears 21 through 26 are rotated therewith. Similarly, a second countershaft 30 is rotatably supported within the main housing 7 of the transmission case on a pair of tapered bearings (only the forward tapered bearing 30a is illustrated). A plurality of gears 31, 32, 33, 34, 35, and 36 are keyed onto the second countershaft 30 for rotation therewith. The radially outwardly extending teeth of the input drive gear 15 also mesh with a corresponding plurality of teeth formed on the first one 31 of the second countershaft gears. Thus, when the input shaft is rotated, the input drive gear 15, the second countershaft 30, and all of the second countershaft gears 31 through 36 are also rotated therewith.

A main shaft 40 is also provided within the main housing 6 of the transmission case. A plurality of annular main shaft gears 41, 42, 43, and 44 are disposed co-axially about the main shaft 40. The first main shaft gear 41 meshes with both the second one 22 of the first countershaft gears and the second one 32 of the second countershaft gears. Similarly, the remaining main shaft gears 42, 43, 44 mesh with the corresponding ones of the first countershaft gears 23, 25, 26 and the second countershaft gears 33, 35, and 36. An annular output drive gear 45 is also disposed co-axially about the main shaft 40.

A plurality of hollow cylindrical clutch collars 46, 47, and 48 are splined onto the main shaft 40 for rotation therewith. Each of the clutch collars 46, 47, and 48 is illustrated in FIG. 1 in a neutral or non-gear engaging position. However, each of the clutch collars 46, 47, and 48 is axially movable relative to the main shaft 40 between first and second gear engaging positions. For example, the first clutch collar 46 may be moved axially forwardly (toward the left when viewing FIG. 1) so as to connect the input drive gear 15 to the main shaft 40 for direct drive operation. The first clutch collar 46 may alternatively be moved axially rearwardly (toward the right when viewing FIG. 1) so as to connect the first main shaft gear 41 to the main shaft 40 for gear reduction operation. The other clutch collars 47 and 48 may be moved in a similar way to control the operation of the transmission 5 in a known manner.

As is well known, axial movement of the clutch collars 46, 47, and 48 is accomplished by respective shift forks (not shown) which engage each of the clutch collars 46, 47, and 48. The shift forks are mounted on respective shift rails (not shown) for axial movement therewith forwardly and rearwardly. Typically, a shift tower containing a manually operable shift lever (not shown) is provided for selecting one of the shift rails for movement and for shifting the selected shift rail forwardly or rearwardly as desired. It will be appreciated, however, that such selecting and shifting actions may alternatively be performed by any known automatic or automated manual apparatus.

As mentioned above, the illustrated transmission 5 is a compound transmission. The components of the illustrated transmission 5 thus far described constitute the main section of the transmission, which provides a predetermined number of speed reduction gear ratios. The illustrated transmission 5 further includes a conventional auxiliary section, which is located rearwardly (toward the right when viewing FIG. 1) of the main section and is separated therefrom by the interior wall 7a of the main case 7 of the transmission housing. The auxiliary section also provides a predetermined number of speed reduction gear ratios in a known manner. The total number of speed reduction gear ratios available from the transmission 5 as a whole, therefore, is equal to the product of the gear ratios available from the main section and the gear ratios available from the auxiliary section. Lastly, the transmission 5 includes an output shaft 50 which is rotatably driven at a predetermined gear ratio relative to the input shaft 11 whenever the transmission 5 is engaged for use.

Figure 2:
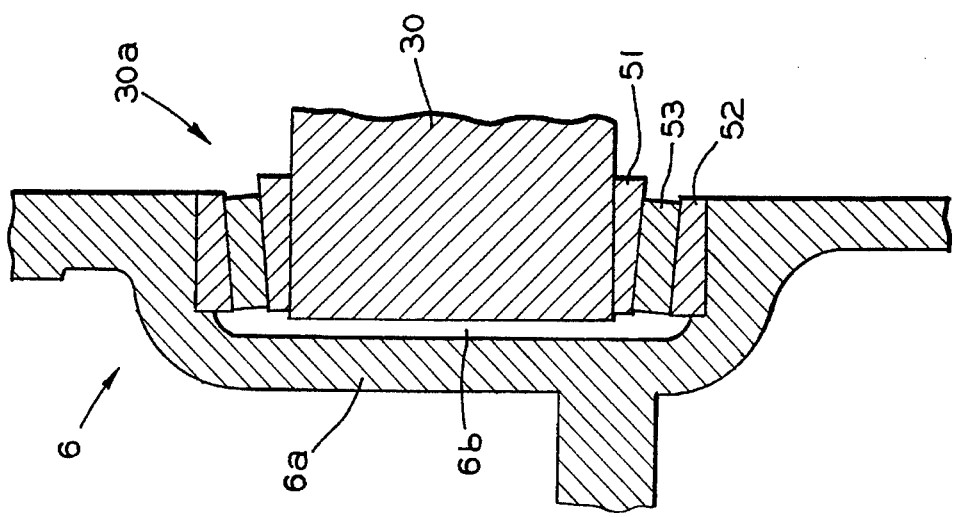
FIG. 2 is an enlarged view of portions of the clutch housing, bearing, and one of the countershafts of the prior art vehicle transmission illustrated in FIG. 1.

Referring now to FIG. 2, a portion of the interior wall 6a of the clutch housing 6, the bearing 30a, and a portion of the countershaft 30 of the transmission 5 are illustrated in detail. As shown therein, the generally cylindrical bore or recess 6b is formed in the interior wall 6a of the clutch housing 6. The bearing 30a includes an inner race 51, an outer race 52, and a plurality of rollers 53 disposed between the inner race 51 and the outer race 52. A cage (not shown) may also be provided to retain the rollers 53 in proper positions between the inner race 51 and the outer race 52. In the illustrated embodiment, the bearing 30a is embodied as a conventional tapered roller bearing assembly, and the rollers 53 are embodied as cylinders. However, the bearing 30a may be embodied as any one of a number of similar known structures. The outer race 52 is pressed into the bore 6b so as to be frictionally engaged therewith. Typically, the outer diameter of the outer race 52 of the bearing 30a is sized to be equal to the inner diameter of the bore 6b, plus or minus 0.001 inch. Such a frictional engagement securely retains the bearing 30a within the bore 6b and prevents any relative rotation from occurring between the outer race 52 and the clutch housing 6.

In the prior art transmission 5 illustrated in FIGS. 1 and 2, the clutch housing 6 is formed from iron, while the outer race 52 of the bearing 30a is formed from steel. When subjected to an increase in temperature, these two materials expand at rates which are relatively similar. Such an increase in temperature will occur whenever the transmission 5 is operated normally for a period of time. However, the frictional engagement of the outer race 52 with the inner surface of the bore 6b remains relatively constant because the two components expand at approximately the same rate.

Figure 3:
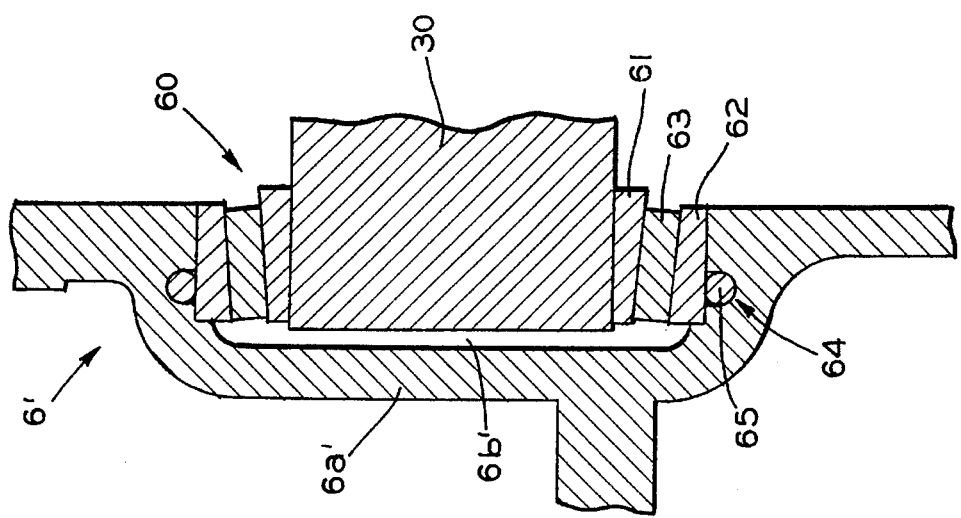
FIG. 3 is an enlarged view similar to FIG. 2 illustrating a bearing support structure in accordance with this invention.

FIG. 3 is similar to FIG. 2, but illustrates the structure of this invention in detail. The iron clutch housing 6 of the prior art transmission 5 shown in FIGS. 1 and 2 has been replaced by a clutch housing 6' formed from an aluminum alloy. Hereinafter "aluminum" will refer both to aluminum alloys and to aluminum—both can be used. The clutch housing can also be formed from magnesium, magnesium alloys, or other metals having similar thermal properties. The structure of the aluminum clutch housing 6' is essentially the same as the iron clutch housing 6 illustrated in FIGS. 1 and 2. Thus, the aluminum clutch housing 6' includes an interior wall 6a' having a bore 6b' formed therein. The remaining components of the transmission of this invention are identical to the conventional transmission 5 illustrated in FIGS. 1 and 2, and like reference numbers are used to indicate corresponding components.

In FIG. 3, a portion of the interior wall 6a' of the modified clutch housing 6' in accordance with this invention, a bearing 60, and a portion of the countershaft 30 of the transmission are illustrated in detail. The bearing 60 includes an inner race 61, an outer race 62, and a plurality of rollers 63 disposed between the inner race 61 and the outer race 62. A cage (not shown) may also be provided to retain the rollers 63 in proper positions between the inner race 61 and the outer race 62. In the illustrated embodiment, the bearing 60 is embodied as a conventional tapered roller bearing assembly, and the rollers 63 are embodied as cylinders. However, the bearing 60 may be embodied as any one of a number of similar known structures, for example ball bearings, cylindrical roller bearings or needle bearings. The outer race 62 is pressed into the bore 6b' so as to be frictionally engaged therewith when both of the components are in a relatively cold condition. Typically, the outer diameter of the outer race 62 of the bearing 60 is sized to be equal to the inner diameter of the bore 6b', plus or minus 0.001 inch, when both of the components are in a relatively cold condition. Such a frictional engagement securely retains the bearing 60 within the bore 6b' and prevents any relative rotation from occurring between the outer race 62 and the clutch housing 6' so long as both components remain in a relatively cold condition.

The clutch housing 6' of this invention differs from the prior art clutch housing 6 in that a circumferential groove 64 is formed in the side wall of the bore 6b', and an expandable O-ring 65 is disposed in the groove 64. The groove 64 and O-ring 65 can be located anywhere along the side wall of the bore 6b', but preferably they are located in the forward half of the bore 6b' (toward the left as seen in the drawing) to allow the bearing 60 to pilot within the bore 6b' during installation.

The O-ring 65 can be formed from any compressible or elastomeric material. Preferred materials include synthetic rubber and certain plastics or other synthetics such as nylons. A synthetic rubber, such as Viton, is most preferred. While the invention will be discussed in relation to an O-ring, any type of ring made from a compressible or elastomeric material may be used. For example, the radial cross section of the ring can be in the shape of a square, a rectangle, or a star, in addition to a circle. Also, the ring does not have to be a continuous ring all the way around the circumference of the recess. Rather, there may be one or more discontinuities in the ring so long as it provides the function described hereinbelow.

The O-ring 65 is sized to be slightly larger in diameter than the diameter of the groove 64. During assembly, it is desirable that the O-ring 65 be sprayed with a lubricant before being installed within the groove 64. Then, the O-ring 65 is again sprayed with a lubricant when the bearing 60 is pressed into the bore 6b' to assist O-ring compression. When the outer race 62 is pressed into the bore 6b', the O-ring 65 is compressed completely within the groove 64. So long as both the aluminum clutch housing 6' and the steel outer race 62 of the bearing 60 remain in a relatively cold condition, the outer race 62 will frictionally engage the inner surface of the bore 6b', thus preventing any relative rotational movement therebetween.

Figure 4:
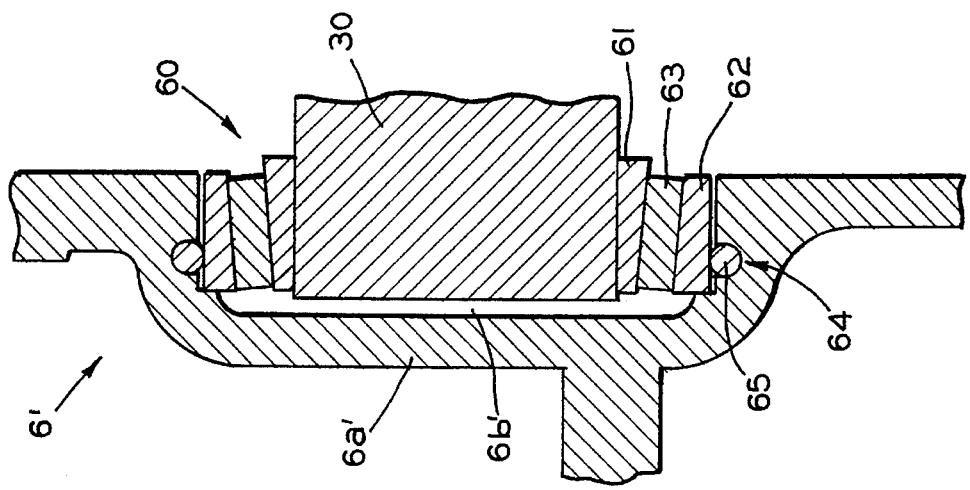
FIG. 4 is an enlarged view similar to FIG. 3 illustrating in a somewhat exaggerated manner the bearing support structure of this invention after the temperature of the vehicle transmission has increased and thermal expansion has occurred.

However, during normal usage of the transmission, the temperatures of both the aluminum clutch housing 6' and the steel outer race 62 of the bearing 60 will increase. Because aluminum expands at a greater rate per unit temperature than steel, the inner diameter defined by the bore 6b' will increase at a greater rate than the outer diameter defined by the outer race 62. As a result, a small gap may be created therebetween, as illustrated in a somewhat exaggerated manner in FIG. 4. Absent any other structure, this gap would otherwise permit relative rotation to occur between the outer race 62 and the aluminum clutch housing 6'. However, when this gap is created, the O-ring 65 expands out of the groove 64 formed in the inner surface of the bore 6b' to maintain a frictional engagement with the outer race 62 of the bearing 60. Consequently, relative rotation between the two is prevented.

Expansion of the O-ring 65 occurs more rapidly than the thermal expansion of the aluminum of the clutch housing and steel of the bearing. The O-ring 65 thus maintains the frictional engagement between the outer race 62 and the inner surface of the bore 6b' of the aluminum clutch housing 6 even when the temperature of the transmission increases rapidly. This avoids premature wear and failure which can result from such relative rotational movement. Rapid expansion of the O-ring 65 occurs both from mechanical expansion (i.e., from decompression after being compressed in the groove), and from thermal expansion. Preferably the O-ring 65 is made from a material which has a greater rate of thermal expansion than the aluminum and steel, and most preferably from a material such as the synthetic rubber which has a rate of thermal expansion about five to seven times greater than aluminum and about ten to fifteen times greater than steel.

The present invention thus prevents relative rotation between the bearing and the bore without resorting to an interference fit with its associated drawbacks. At the same time, the expanding O-ring 65 may function as a buffer between the inner surface of the bore 6b' of the aluminum clutch housing 6' and the outer race 62 of the bearing 60, allowing self-centering of the bearing 60 within the bore 6' and reducing noise and wear which might result from misalignment.

This invention has been explained in the context of the twin countershaft compound transmission illustrated in FIG. 1. However, it will be appreciated that this invention may be used in any other type of transmission or other device wherein a bearing having an outer race formed from a first material is installed within a bore provided in a wall formed from a second material, so long as the second material has a rate of thermal expansion which is greater than the first material.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A bearing support structure comprising:

a wall having a bore defining an axis formed therein, said bore including a radial side wall having a groove formed therein;

an expandable ring disposed in said groove; and a bearing including an outer race which is press fit within said bore so as to frictionally engage said side wall in a radial direction when said outer race and said side wall are in a relatively cold condition, said outer race being formed from a first material and said side wall of said bore being formed from a second material having a rate of thermal expansion which is greater than a rate of thermal expansion of said first material such that said expandable ring frictionally engages said outer race in said radial direction when said outer race and said side wall are in a relatively hot condition to prevent rotation therebetween.

2. The bearing support structure defined in claim 1 wherein said bore is generally cylindrical in shape and said bearing is generally annular in shape.

3. The bearing support structure defined in claim 1 wherein said ring is formed from an elastomeric material.

4. The bearing support structure defined in claim 3 wherein said ring is formed from synthetic rubber.

5. The bearing support structure defined in claim 1 wherein said first material is steel and said second material is selected from the group consisting of aluminum, aluminum alloys, magnesium and magnesium alloys.

6. The bearing support structure defined in claim 1 wherein said groove is a circumferential groove, and wherein said ring is an O-ring.

7. The bearing support structure defined in claim 1 wherein said ring has a rate of thermal expansion which is greater than said rate of thermal expansion of said second material.

8. The bearing support structure defined in claim 1 wherein said wall is an interior wall of a case for a transmission, and wherein said bearing rotatably supports a shaft within said case of said transmission.

9. The bearing support structure defined in claim 1 wherein said groove and said ring are located in a forward half of said side wall.

10. A transmission comprising:

a case including an interior wall having a bore defining an axis formed therein, said bore including a radial side wall having a groove formed therein;

an input shaft extending within said case;

an output shaft extending within said case;

a plurality of gears contained within said case and selectively connectable between said input shaft and said output shaft for providing a plurality of gear ratios therebetween;

an expandable ring disposed in said groove; and a bearing including an outer race which is press fit within said bore so as to frictionally engage said side wall in a radial direction when said outer race and said side wall are in a relatively cold condition, said outer race being formed from a first material and said side wall of said bore being formed from a second material having a rate of thermal expansion which is greater than a rate of thermal expansion of said first material such that said expandable ring frictionally engages said outer race in said radial direction when said outer race and said side wall are in a relatively hot condition to prevent rotation therebetween.

11. The transmission defined in claim 10 wherein said bore is generally cylindrical in shape and said bearing is generally annular in shape.

12. The transmission defined in claim 10 wherein said case includes a clutch housing, and wherein said bore is formed in an interior wall of said clutch housing.

13. The transmission defined in claim 10 wherein said bearing rotatably supports a shaft within said case of said transmission.

14. The transmission defined in claim 13 wherein said shaft is selected from the group consisting of countershafts and main shafts.

15. The transmission defined in claim 10 wherein said ring is formed frown an elastomeric material.

16. The transmission defined in claim 15 wherein said ring is formed from synthetic rubber.

17. The transmission defined in claim 10 wherein said first material is steel and said second material is selected from the group consisting of aluminum, aluminum alloys, magnesium and magnesium alloys.

18. The transmission defined in claim 10 wherein said groove is a circumferential groove, and wherein said ring is an O-ring.

19. The transmission defined in claim 10 wherein said ring has a rate of thermal expansion which is greater than said rate of thermal expansion of said second material.

20. The transmission defined in claim 10 wherein said groove and said ring are located in a forward half of said side wall.

* * * * *